(12) United States Patent
Cheng et al.

(10) Patent No.: US 8,837,076 B1
(45) Date of Patent: Sep. 16, 2014

(54) IN SITU SENSOR BASED CONTACT DETECTION

(71) Applicant: Seagate Technology LLC, Cupertino, CA (US)

(72) Inventors: CheeWee Cheng, Singapore (SG); Subhash Guddati, Singapore (SG); ShengYuan Lin, Singapore (SG); Andy Chou, Singapore (SG); SweeChuan Samuel Gan, Singapore (SG); Stefan Ionescu, Burnsville, MN (US); Scott Ryun, Victoria, MN (US); Richard Martin, Longmont, CO (US); Jesse Speckhard, Douglas, MA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/844,643

(22) Filed: Mar. 15, 2013

(51) Int. Cl.
  *G11B 21/02* (2006.01)
  *G11B 5/60* (2006.01)

(52) U.S. Cl.
  CPC .................. *G11B 5/607* (2013.01)
  USPC .......................................... 360/75

(58) Field of Classification Search
  None
  See application file for complete search history.

(56) References Cited

U.S. PATENT DOCUMENTS

| | | | |
|---|---|---|---|
| 5,196,970 A * | 3/1993 | Seko et al. .................. | 360/77.03 |
| 6,765,745 B2 | 7/2004 | Smith et al. | |
| 6,898,034 B2 | 5/2005 | Dakroub et al. | |
| 6,967,805 B1 | 11/2005 | Hanchi et al. | |
| 7,038,875 B2 | 5/2006 | Lou et al. | |
| 7,046,473 B2 | 5/2006 | Fu et al. | |
| 7,097,110 B2 * | 8/2006 | Sheperek et al. ............. | 236/1 C |
| 7,180,692 B1 | 2/2007 | Che et al. | |
| 7,256,957 B1 * | 8/2007 | Rahgozar ........................ | 360/75 |
| 7,440,219 B2 | 10/2008 | Zhu et al. | |
| 7,522,360 B2 | 4/2009 | Imamura et al. | |
| 7,986,487 B1 | 7/2011 | Madden et al. | |
| 8,139,310 B1 * | 3/2012 | Hogg .............................. | 360/75 |
| 8,297,113 B2 | 10/2012 | Liners et al. | |
| 8,593,753 B1 * | 11/2013 | Anderson ........................ | 360/75 |
| 2002/0093761 A1 * | 7/2002 | Payne et al. .................... | 360/125 |
| 2005/0201001 A1 * | 9/2005 | Conteras et al. ................ | 360/75 |
| 2006/0285243 A1 * | 12/2006 | Baumgart et al. .............. | 360/75 |
| 2007/0236821 A1 * | 10/2007 | Ma et al. ......................... | 360/75 |
| 2007/0268612 A1 * | 11/2007 | Fitzpatrick et al. ............. | 360/75 |
| 2009/0296256 A1 * | 12/2009 | Tsuyama ........................ | 360/59 |
| 2011/0157736 A1 * | 6/2011 | Contreras et al. ............... | 360/29 |
| 2011/0235207 A1 | 9/2011 | Yang | |
| 2011/0235208 A1 | 9/2011 | Yang | |
| 2013/0188273 A1 * | 7/2013 | Miyamoto et al. .............. | 360/59 |

* cited by examiner

*Primary Examiner* — Peter Vincent Agustin (74) *Attorney, Agent, or Firm* — Hall Estill Attorneys at Law (57) ABSTRACT

Apparatus and method for positional sensing and control. In accordance with some embodiments, a transducer is positioned adjacent a recording medium. The transducer includes a write element, a read element, a heater and a thermally responsive sensor. Power is applied to the heater to establish a selected fly height of the transducer relative to the medium. A contact event between the transducer and the medium is detected responsive to an accumulated plural count of pulses in a bias signal obtained from the thermally responsive sensor.

20 Claims, 6 Drawing Sheets

FIG. 12

IN SITU SENSOR BASED CONTACT DETECTION

SUMMARY

Various embodiments of the present disclosure are generally directed to positional sensing and control.

In accordance with some embodiments, a transducer is positioned adjacent a recording medium. The transducer includes a write element, a read element, a heater and a thermally responsive sensor. Power is applied to the heater to establish a selected fly height of the transducer relative to the medium. A contact event between the transducer and the medium is detected responsive to an accumulated plural count of pulses in a bias signal obtained from the thermally responsive sensor.

These and other features and aspects which characterize various embodiments of the present disclosure can be understood in view of the following detailed discussion and the accompanying drawings.

DETAILED DESCRIPTION

The present disclosure generally relates to positional control systems, such as the type used to control a fly height of a data transducer adjacent a rotatable data storage medium.

Some data storage devices use a transducer to write data to and read data from a rotatable data storage medium. The transducer may be hydrodynamically supported adjacent the rotating data medium by fluidic currents that interact with a fluidic (air) bearing surface. A fly height adjustment mechanism can be used to adjust the fly height of the transducer to an appropriate level, and a contact detection system can be used to detect contact events between the transducer and the medium surface.

A calibration routine can be carried out to select appropriate fly heights during read and write operations to allow the transducer to fly in close, stable proximity to the medium surface while substantially avoiding contact events. Such calibration routines can rely on a variety of sensor inputs such as read sensor data from a read element of the transducer used to read data from the medium, motor control inputs from a voice coil motor (VCM) used to position the transducer, etc. Signals from the read element can include position error signals (PES), VCM signals, etc. These approaches generally rely on horizontal displacement (off-track detection) to identify a contact event.

While operable, one limitation with such approaches is the reliance on the detection of horizontal off-track displacement to sense a change in vertical displacement of the transducer relative to the medium surface. Contact occurs when the vertical displacement (fly height) essentially becomes zero. Once contact is made, however, the transducer may be displaced laterally (horizontally), exhibiting off-track error that can be sensed from measured positional error or changes in readback signal amplitude. Relying on horizontal displacement measurements is reactive since the displacement can generally be measured only once contact has taken place.

Another limitation with such current generation off-track situ detectors is that significant contact with the medium may be required before contact can be detected. Detectors may exhibit different responses at different skew angles and/or radial locations on the medium, as well as different responses based on a number of operational parameters including temperature, write quality, read quality, servo errors, offsets, actuator tolerances, and so on. Extended contact situations can increase burnishing of a medium surface and other deleterious effects.

As continued increases in areal data storage densities drive higher track densities, the individual tracks become smaller, which decreases servo margin (e.g., servo signal to noise ratio SNR). Using servo based algorithms to compute the degree of off-track becomes increasingly less precise for lower levels of servo SNR.

Accordingly, various embodiments of the present disclosure are generally directed to an in situ vertical displacement detection and control system. As explained below, in some embodiments a transducer is adapted to fly in non-contacting relation to a rotating data storage medium. The transducer includes a write element, a read element, a heater unit and a thermally responsive sensor. In some embodiments, the heater unit and/or the thermally responsive sensor can be included in or combined with the write element or the read element.

A control circuit is adapted to provide respective signals to each of the transducer elements. These signals may include a write signal to the write element to write data to the medium during a write operation, a read bias signal to the read element to read back data stored to the medium during a read operation, a heater signal to the heater to adjust a fly height of the transducer, and a thermal bias signal to the thermally responsive sensor to detect a contact event between the transducer and the medium.

The control circuit is adapted to perform a noise floor calibration routine to establish appropriate signal detection thresholds during read and write operations, followed by a detection routine to establish suitable fly heights for the transducer during such read and write operations. Thereafter, the control circuit can monitor the system for the occurrence of contact events and take corrective actions to reduce the impact on system performance.

In some embodiments, the control circuit forms a portion of a preamplifier/driver (preamp) circuit of a data storage device. The preamp performs in situ calibration and detection at appropriate times during the operational life of the device. The thermally responsive sensor may be a high temperature coefficient of resistance (TCR) element that translates small temperature changes to large electrical signal changes. The preamp biases the thermally responsive sensor, amplifies the output signal from the sensor, and processes the amplified signal.

Some embodiments derive the final fly height values for the transducer based on three main variables: the filter bandwidth necessary to capture a contact signal from the output of the sensor, the bias level applied to the sensor to obtain optimal SNR response, and the detection threshold level suitable to reliably detect a contact event. The first two variables can be empirically determined. The third can be established by the noise floor calibration routine to be discussed in detail below.

Figure 1A:
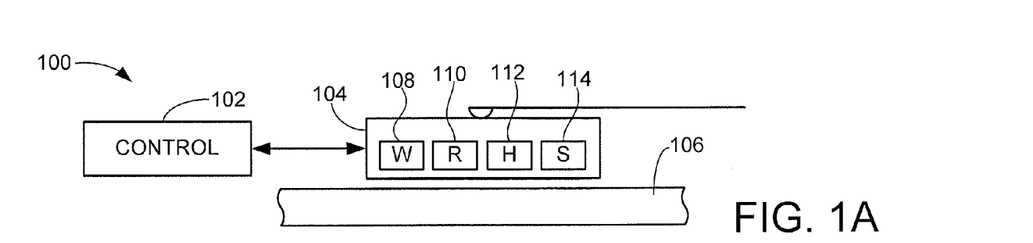
FIG. 1A is a functional representation of a data storage device.

FIG. 1A is a functional block diagram of a data system 100 in accordance with some embodiments. The data system 100 includes a control circuit 102, and a transducer 104 adjacent a data storage medium 106. The transducer 104 incorporates a slider (not separately shown) with hydrodynamic features such as an air bearing surface (ABS) to facilitate stable support of the transducer 104 above and in close proximity to the storage medium 106 during rotation of the medium.

The control circuit 102 interfaces with various operational elements of the transducer 106. These elements include a write element 108, a read element 110, and optionally a separate heater 112 and thermally responsive sensor 114.

The write element 108 is used to magnetically write data to data tracks defined on the medium surface. The write element may employ perpendicular magnetic recording and heat assisted magnetic recording (HAMR) techniques. The read element 110 is used to sense the previously written magnetic data, and may utilize a magneto-resistive (MR) sensor or similar design. The heater 112 generally constitutes a thermally responsive material that mechanically expands due to the application of power (e.g., current) in relation to a coefficient of thermal expansion of the material. The thermal expansion of the heater 112 brings the write and read elements 108, 110 closer to the medium surface. Separate write and read heaters may be used as desired. In some embodiments the write element 108 may serve as heater 112.

The thermally responsive sensor 114 comprises a resistive material that operates as a highly sensitive thermal transducer. The control circuit 102 applies a sense bias current through the sensor 114 and pulses are induced in the bias current responsive to changes in thermal state. Multiple sensors can be used, including sensors arranged at different corners or other locations on the slider. Individual bias currents may be supplied to each of the thermally responsive sensors 114. In some embodiments the read element 110 may also serve as thermally responsive sensor 114.

Figure 1B:
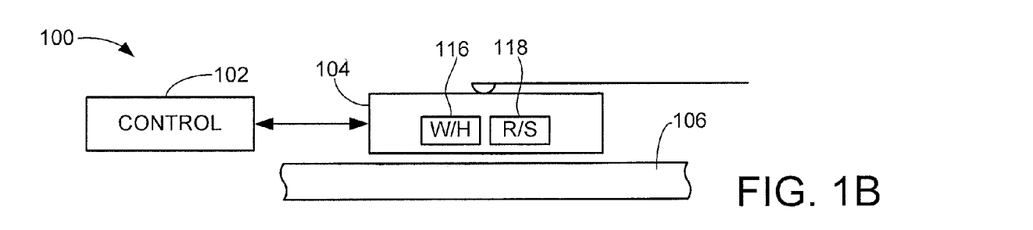
FIG. 1B is another functional representation of the device of FIG. 1A.

FIG. 1B is another representation of the device 100 of FIG. 1A. A combined writer/heater (W/H) is depicted at 116, and a combined reader/sensor (R/S) is depicted at 118.

Figure 2:
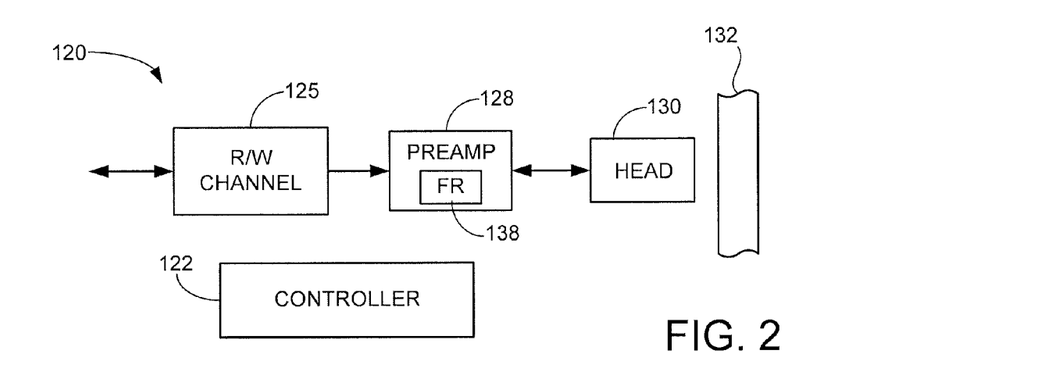
FIG. 2 is a functional representation of another data storage device.

FIG. 2 depicts another data system 120 similar to the system 100 of FIGS. 1A-1B. The data system 120 of FIG. 2 is characterized as a hard disc drive (HDD) data storage system, although such is merely exemplary and not limiting. The system 120 includes a controller 122 that provides top level control for the device. A read/write (R/W) channel 125 includes a write channel portion operable to encode input write data from the host to provide a serialized data stream to a preamplifier/driver (preamp) 128.

The preamp 128 provides a sequence of write currents to a transducer (head) 130 to write data to a magnetic data recording medium 132 during a write operation. During a read operation, the preamp 120 obtains readback signals from the transducer 130, conditions and amplifies the readback signals, and provides the same to a read channel portion of the R/W channel 125. The read channel portion applies signal processing techniques to recover the originally stored data, which may be stored in a buffer of an interface (I/F) circuit (not shown) pending subsequent transfer to the host.

During both read and write operations, specially configured servo positioning data on the medium 132 may be recovered by the transducer 130 and supplied to a servo control circuit (not separately shown). A fault register (FR) 138 is provided in the preamp 128 which can be used during calibration processing as discussed below.

Figure 3:
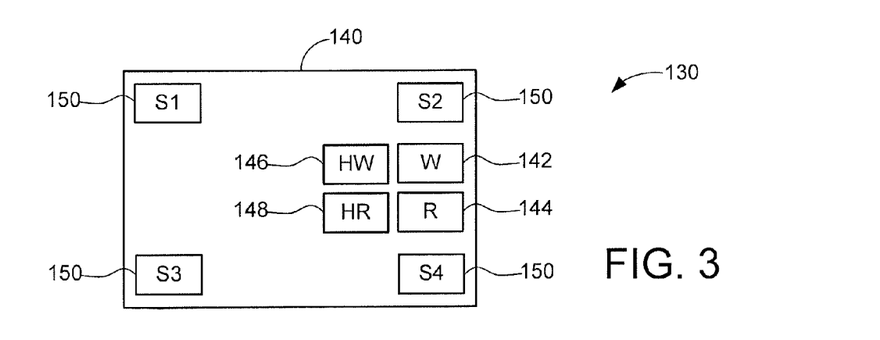
FIG. 3 shows an arrangement of the data transducer of FIG. 2 in accordance with some embodiments.

FIG. 3 depicts the transducer 130 of FIG. 2 in accordance with some embodiments. A slider 140 supports a write element 142, a read element 144, a write heater 146, a read heater 148, and four thermal sensors 150 denoted as sensors S1-S4. The preamp 128 (FIG. 2) supplies appropriate control signals to each of these elements during operation. The thermal signals from the sensors 150 can be separately analyzed or combined into a composite signal, as desired. It will be appreciated that the relative placement and locations of the various elements can vary as desired. The sensors 150 can be nominally identical or individually tailored for different lateral locations on the slider 140. Sensors S1-S4 can be placed in locations where information regarding contact events may be collected. The total number of sensors 150 can include two, three, five or any amount of sensors that meet the needs of the system 100.

Figure 4:
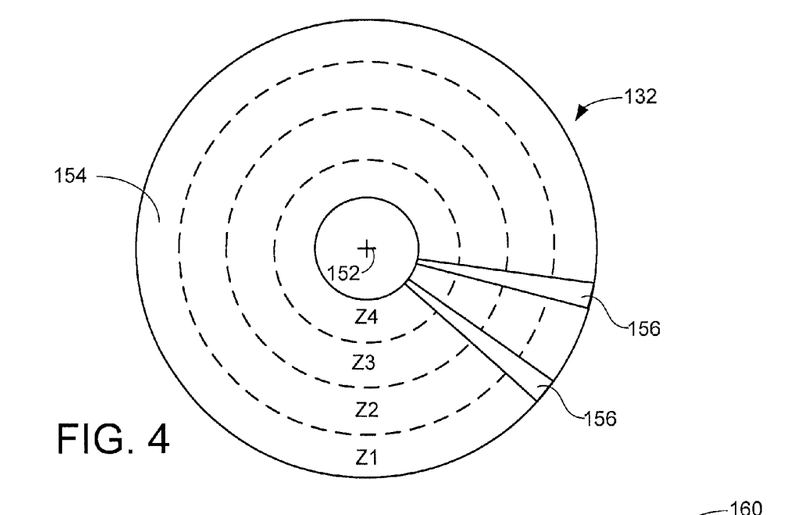
FIG. 4 depicts the storage medium of FIG. 2 in accordance with some embodiments.

FIG. 4 shows the storage medium 132 of FIG. 2 in accordance with some embodiments. The medium 132 may be characterized as a perpendicular magnetic recording disc, heat assisted recording disc, or bit patterned disc, although such is merely for purposes of illustration and is not limiting.

The data tracks on the medium 132 are grouped together into a number of concentric zones 154. The zones are denoted herein as Zones 1-4 (Z1-Z4). Separate write and read fly height calibration values can be determined for each zone. Any number of different zones can be defined based on the desired resolution including zones of different sizes, locations and radial widths.

The servo data used by the servo circuit 134 in FIG. 2 can be arranged as a plurality of servo wedges, two of which are represented at 156. The servo wedges are arrayed in spaced apart fashion around the circumference of the medium 132 much like spokes of a wheel. While only two servo wedges 156 are depicted in FIG. 4, it will be appreciated that several hundred such wedges (or more) may be provisioned around the medium. User data are written to sectors along the tracks in the areas between adjacent pairs of the servo wedges 156. The servo wedges 156 provide the requisite servo positioning control data to the servo circuit 134 (FIG. 2) to facilitate precise positioning of the respective read and write elements 142, 144 during read and write operations as well as during calibration processing.

Figure 5:
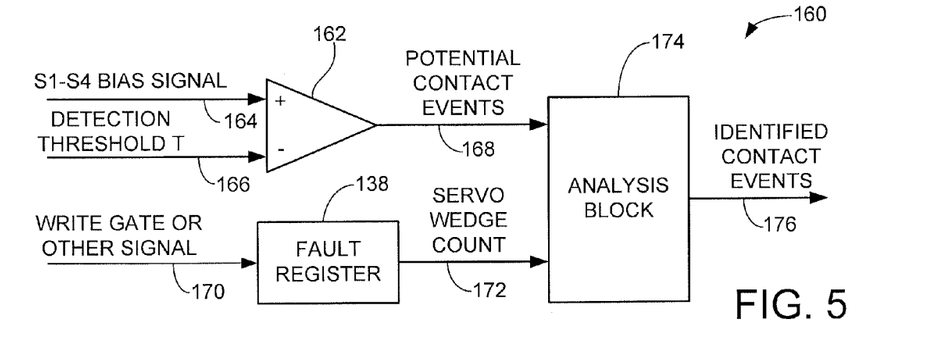
FIG. 5 is a comparator circuit of the preamp of FIG. 3.

FIG. 5 represents a calibration processing circuit 160 which can be incorporated into the preamp 128. A comparator 162 receives an input signal on path 164 from one or more of the thermally responsive sensors 150 (S1-S4) of FIG. 3. Upstream signal amplification, filtering and other processing may be applied by the preamp 128 to the input signal on path 164. A detection threshold T is supplied as a second input to the comparator 162 via path 166. Potential contact events are output as pulses on output path 168 responsive to a comparison of the inputs on paths 164 and 166.

The fault register 138 (see FIG. 2) of the preamp 128 receives a data input on path 170 to enable the register to accumulate a count of servo wedges over each disc revolution. Any number of suitable signals can be provided, such as a write gate signal or other signal. A servo wedge count is output on path 172. An analysis block 174 subtracts the servo wedge count from the potential contact events to output a detected contact event count on path 176. This allows contact events that arise other than from the passage of a servo wedge to be identified.

Figure 6:
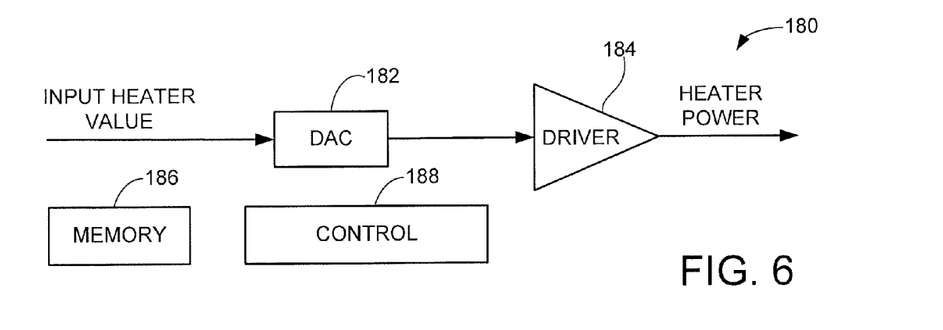
FIG. 6 depicts a heater power control circuit of the preamp of FIG. 3.

FIG. 6 provides a heater control circuit 180 of the preamp 128 in accordance with some embodiments. The heater control circuit 180 includes a digital to analog converter 182 and a driver 184. Generally, an input heater power level H, expressed in digital form as a multi-bit representation over a selected range, is converted to a corresponding analog input to the driver 184, which in turn supplies power (such as in the form of applied voltage and/or current) to the associated heater (e.g., the write heater 146 or the read heater 148 of FIG. 3).

A separate driver can be provided for each heater, or the circuit 180 can be multiplexed using suitable switching circuitry (not separately shown) to apply the appropriate heater signals to the respective heater elements. The various parameters used by the system, such as the threshold detection values, the heater values, etc., may be stored in a local memory 186 incorporated into or accessible by the preamp 128. Control functions discussed herein can be carried out by a local preamp controller 188 or by another control circuit, such as the controllers 102, 122 in FIGS. 1-2.

Figure 7:
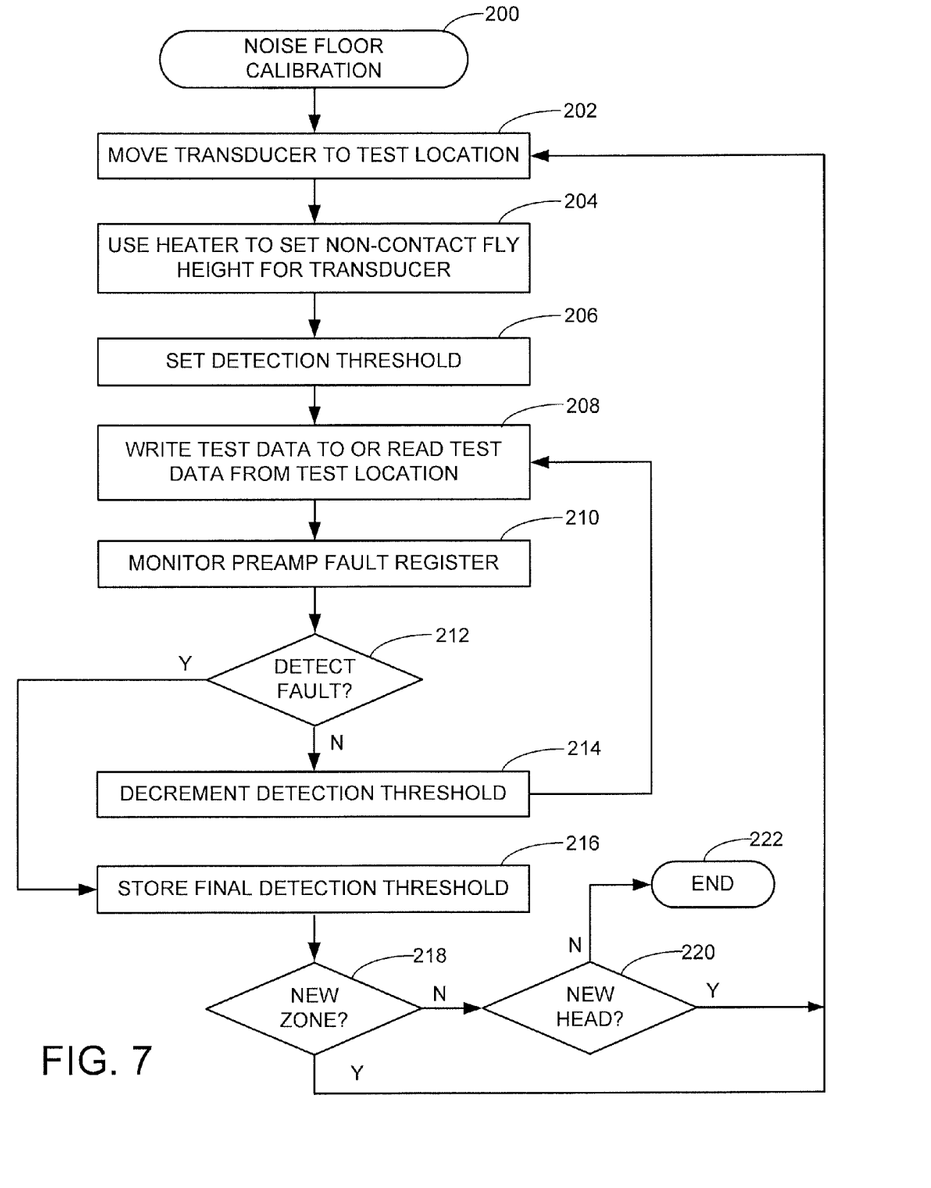
FIG. 7 is a noise floor calibration routine.

FIG. 7 illustrates an adaptive noise floor calibration routine 200. The routine represents processing carried out by and/or under the direction of the preamp 128 or other control circuit at suitable times, such as during idle periods, extended initialization periods, etc. The routine may be executed on a periodically scheduled basis, as well as responsive to a high number of detected contact events.

Generally, the routine 200 determines appropriate detection threshold levels T (path 166, FIG. 5) to be supplied to the output signal(s) from one or more of the thermal sensors 150. Both read and write thresholds can be determined for use during respective read and write operations.

During the routine 200, the transducer 130 is moved to a test track and the routine establishes a predetermined non-contact fly-height level. The thermal sensor(s) are initialized with an initial threshold and other parameters, and the preamplifier fault register (FR block 138 in FIG. 2) is cleared. Separate write and read operations are carried out to arrive at final threshold values which are then saved for future reference. It will be noted that the thresholds generally represent system noise thresholds and constitute a sum of the amplified sensor noise and electronic noise input to the comparator 162.

The routine 200 of FIG. 7 includes moving the associated transducer 130 to a test location, step 202. For purposes of illustration, it will be contemplated that the first test location is located within Zone 1 in FIG. 4. A write calibration sequence is performed first, followed by a read calibration sequence. The write heater 146 is activated at step 204 to establish a predetermined fly height known to be in non-contacting relation to the recording surface. This can be carried out by applying an input digital heater value HW to the DAC 182 in FIG. 6. An initial write detection threshold TW is set at step 206 and applied to the comparator 162 (FIG. 5).

Test data are written to the test track at step 208 using the write element 142 (FIG. 3) over one or more consecutive rotations of the medium. During the writing of data, the respective outputs of the comparator 162 and the preamp fault register (FR) 138 are monitored, step 210. Decision step 212 determines whether any actual contact events were detected. If not, the write detection threshold TW is decremented at step 214 and the process is repeated.

At some point the write detection threshold TW will have been decreased sufficiently to allow at least one contact event to the detected by the analysis block 174. It will be appreciated that an actual contact event may or may not have actually occurred; rather, the output of the block 174 indicates the write detection threshold TW is now at a level sufficient to detect noise in the system. Accordingly, the flow passes from decision step 212 to step 216 where the TW is incremented by a backoff value to provide a final write threshold value TWF which is stored at step 216.

The foregoing processing is repeated to establish a final read threshold value TRF. The read heater 148 (FIG. 3) is activated to establish a non-contact fly height. It will be appreciated that different fly heights may be achieved based on the fact that the write element 142 is not active during the read operation sequence, and therefore less heating will be applied to the transducer 130. The read processing is similar to the write processing except that the previously written track is now read by the read element.

Once final TWF and TRF values are stored for the selected location (e.g. Zone 1), decision step 218 determines whether corresponding threshold values should be determined for additional zones. If so, the foregoing process is repeated until all of the desired write and read threshold values are obtained for the selected transducer 130. Decision step 220 determines whether additional transducers should be evaluated, and if so, corresponding threshold values are obtained for each transducer on a zone-by-zone basis. Once all threshold values for the system have been obtained, the routine ends at step 222.

The final write and read threshold values can be expressed as follows:

$$TWF = TWC + B1$$

$$TRF = TRC + B2 \qquad (1)$$

Where TWF is the final write threshold, TRF is the final read threshold, TWC is the write threshold that was the first to exhibit a detected contact event during write processing, TRC is the read threshold that was the first to exhibit a detected contact event during read processing, and B1 and B2 are backoff values. B1 may be set equal to B2, or these may be different values.

The backoff values B1 and B2 are used because the sensor(s) 150 tend to produce increased sensor noise responsive to increases in temperature. During contact detection, the heater power increases and causes the sensor temperature to increase. The back off value(s) may be determined empirically by evaluating a population of nominally identical devices. A goal is to select appropriate backoff value(s) that are sufficiently high enough to avoid false triggers caused by system noise while being sufficiently low enough to ensure actual contact event declarations do not come too late to avoid inaccuracy or burnishing.

As noted above, in many cases it is expected that the final write threshold TWF will be greater than the final read threshold TRF due to the combination of the preamp behavior due to write and read mode switching during write processing as the sensor reacts to temperature differences as the transducer switches between writing (over data sectors) and reading (over servo wedges). Since during read processing the read element is maintained continuously on over both the data sectors and servo wedges, in some cases the servo counts may not trigger and so the write fault register may not be needed to determine the baseline read noise level.

Figure 8:
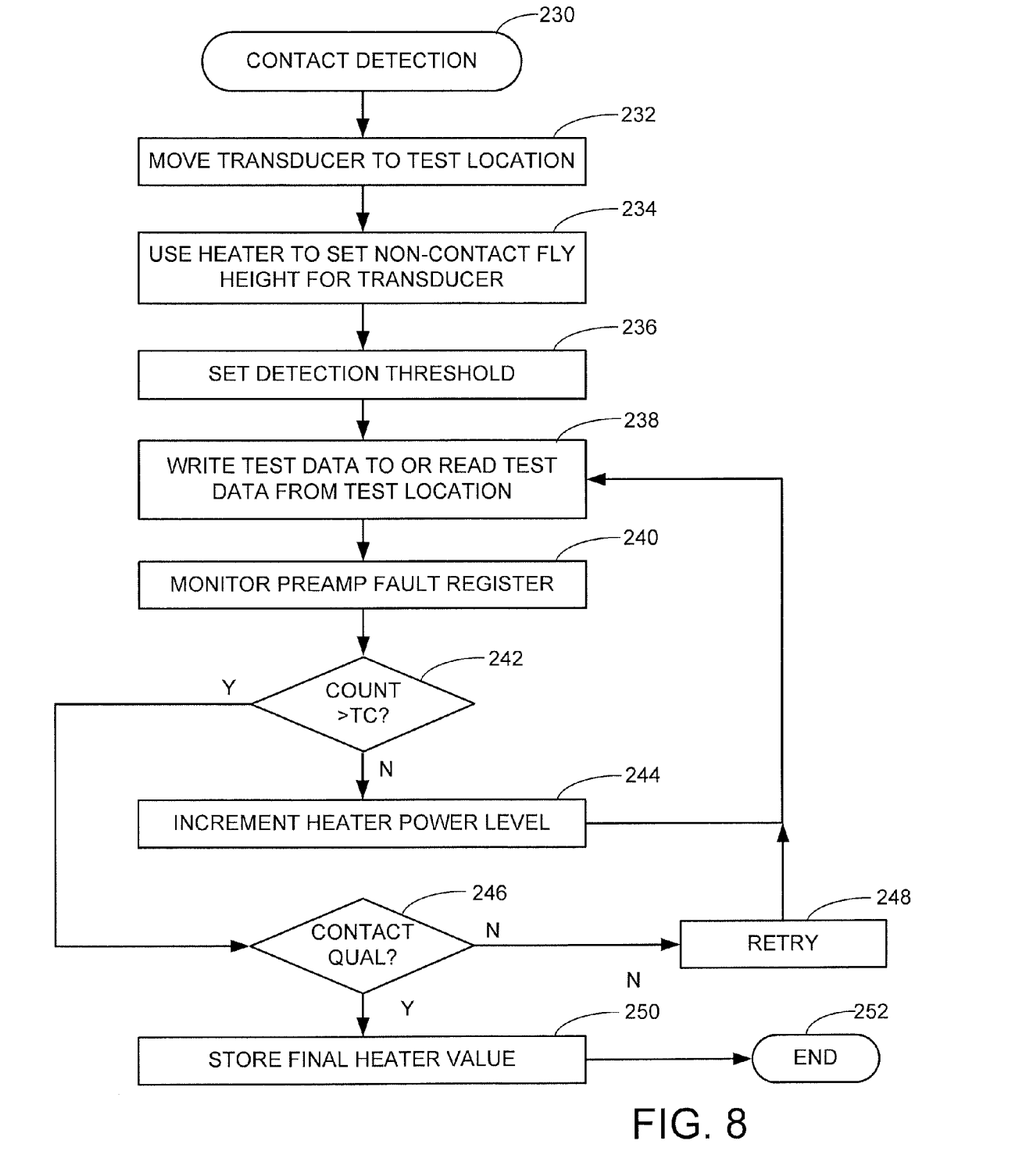
FIG. 8 is a contact detection routine.

Once the final write and read threshold values TWF and TRF are determined, the processing continues in FIG. 8 which provides a contact detection routine 230. The routine 230 is also carried out by and/or under the direction of the preamp 128 or other control circuit to establish appropriate write and read heater values using the detection thresholds from FIG. 7. As before, write processing is carried out first, followed by read processing using one or more test tracks.

Generally, the routine 230 operates to start at a non-contact fly height and perform write operations while monitoring for detected contact events. Write heater power is successively incremented until a final write heater power level HWF is selected and saved. Read processing is carried out in a similar manner to select and save a final read heater power level HRF. The final heater power levels HWF and HRF are thereafter used during normal read and write operations.

During the write processing, the number of detected contact events from the analysis circuit 174 (FIG. 5) is accumulated. If the accumulated count does not exceed a predetermined count threshold TC, the transducer is deemed to not have contacted the medium and the heater power level HW is incremented. The predetermined count threshold is the minimum number of total fault counts at the end of the write operation that is deemed necessary to declare contact. This limit may be determined by the minimum number of contact faults per revolution multiplied by the total number of revolutions in the write operation.

If the parameters are selected properly, a single fault count may be sufficient to identify an actual contact event. In practice, however, the operational environment of an in situ application within a drive or other device can be relatively noisy, leading to the use of multiple counts in order to declare an actual contact event. Post processing steps such as moving averages of the contact count can be applied to declare an actual contact event and filter out spurious signals while reliably providing early detection of actual contacts.

With specific reference to FIG. 8, the system is initialized at step 232, which includes moving the transducer 130 to a selected test track or other location, such as in a selected zone (e.g., Zone 1). Other parametric initializations can take place at this time.

An initial write heater value HW is applied at step 234. It is contemplated that the HW value may be initially relatively low to ensure non-contact during initial stages of the write processing. The detection threshold from FIG. 7 is recalled from memory and applied to the comparator 162 (FIG. 5) at step 236. For this first pass through the routine 230, write processing will be applied so that the final write fault threshold TWF is initially used. During subsequent read processing, the read fault threshold TRF will be used.

Test data are next written to the test track at step 238 over one or more revolutions of the medium. During this writing, the comparator 162 and the fault register (FR) 138 are monitored to establish an accumulated contact count, step 240.

Decision step 242 determines whether the total number of accumulated contacts equals or exceeds the threshold count TC. If not, the heater power HW is increased by a suitable increment at step 244, thereby bringing the transducer 130 closer to the medium 132, and the foregoing steps are repeated.

Once the accumulated count reaches or exceeds the threshold TC, a contact event is identified and the process continues to decision step 246, which determines whether the identified contact event has been qualified. The contact event can be qualified in a variety of ways such as using a time-based rolling average or other statistical means to verify that an actual contact event was detected. For example, a number of detected counts in a relatively localized area as compared to spurious single contact points that are widely distributed around the circumference of the track may be indicative of an actual contact event. Similarly, a localized off-track deflection coincident with or immediately following the contact events may be indicative of an actual contact event.

If the contact is not qualified, the test is repeated as shown by step 248 using the same parameters to determine if the contact event can be repeated. If the contact event is qualified and determined to have occurred with sufficient confidence, the routine passes to step 250 where a final write heater value HWF is selected and stored. The final write heater value may be derated from the last heater value used during the last pass through the routine.

The foregoing steps are then repeated to determine a final read heater value HRF, which is also selected and stored at step 250, after which the process ends at step 252.

It will be appreciated that the routine 230 of FIG. 8 advantageously identifies final write and read heater power levels for subsequent use during normal operation. Relevant portions of the routine 230 can be executed by the preamp during normal read and write operations, respectively, to accumulate counts and identify, as desired, actual contact events.

In the event a contact event is detected during subsequent normal operation, a variety of actions can be taken by the device 120 including a repeating of the associated write or read operation, the application of a write/read verify to ensure the data are correctly written, application of higher levels of on-the-fly error detection/correction to recovered read data to ensure proper readback, on-the-fly adjustments to the applicable write and/or read heater power levels, and so on. Should a statistically significant number of qualified contact events be detected, the system may elect to proceed with a new calibration sequence to obtain updated heater power levels.

Figure 9:
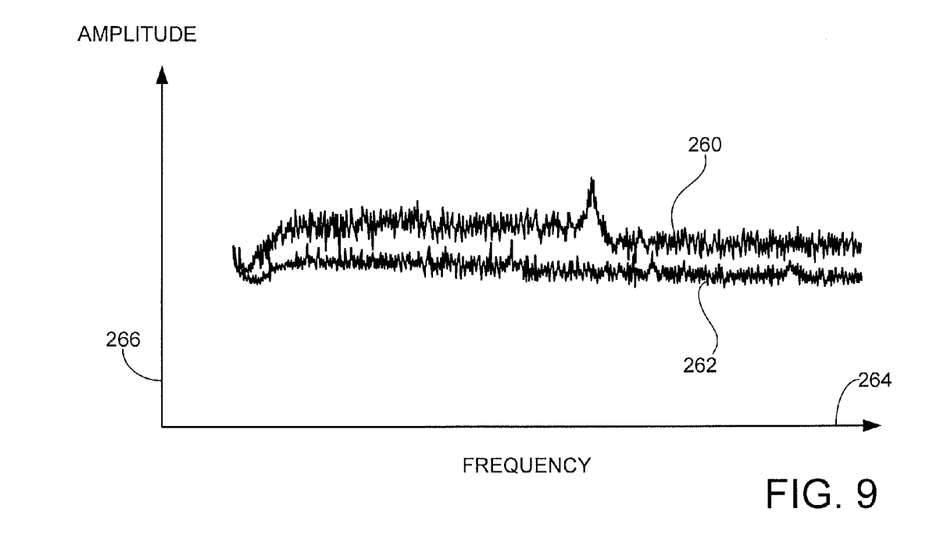
FIG. 9 depicts spectral response of the thermally responsive sensor(s) of FIG. 3.

FIG. 9 presents a graphical representation of first and second signal spectrum waveforms 260, 262 plotted against a frequency x-axis 264 and an amplitude y-axis 266. The waveform 260 represents the signal spectrum from a selected thermally responsive sensor 150 at two different relative fly heights above the associated medium surface.

Waveform 260 is a first lower fly height in which the slider 140 is in close contact proximity, and waveform 262 is a second higher fly height in which the slider 140 is maintained in non-contacting relation to the medium. Peak 268 indicates a localized increase in thermal energy, and this localized peak can be used as part of the detection methodology discussed above. Suitable operational bandwidth and gain settings for the preamp 128 can be derived from such empirical data.

Figure 10:
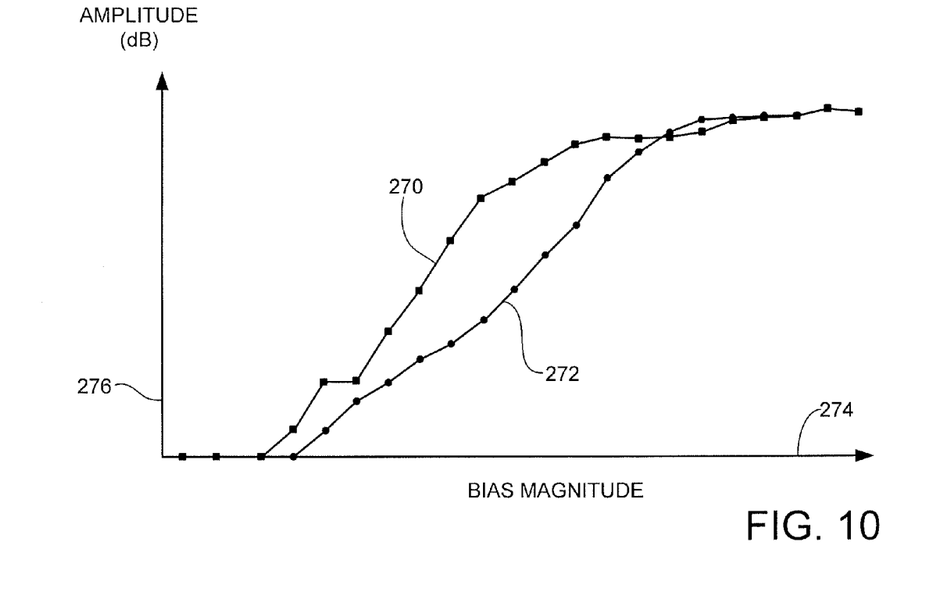
FIG. 10 shows bias response characteristics of the thermally responsive sensor(s).

FIG. 10 depicts bias design point curves 270, 272 plotted against a bias x-axis 274 and amplitude (SNR) y-axis 276. The bias represents the power biasing, such as in the form of applied voltage and/or current, that is supplied to the respective sensors 150 during the foregoing detection processing. Suitable bias levels in substantially linear regions can be selected.

Figure 11:
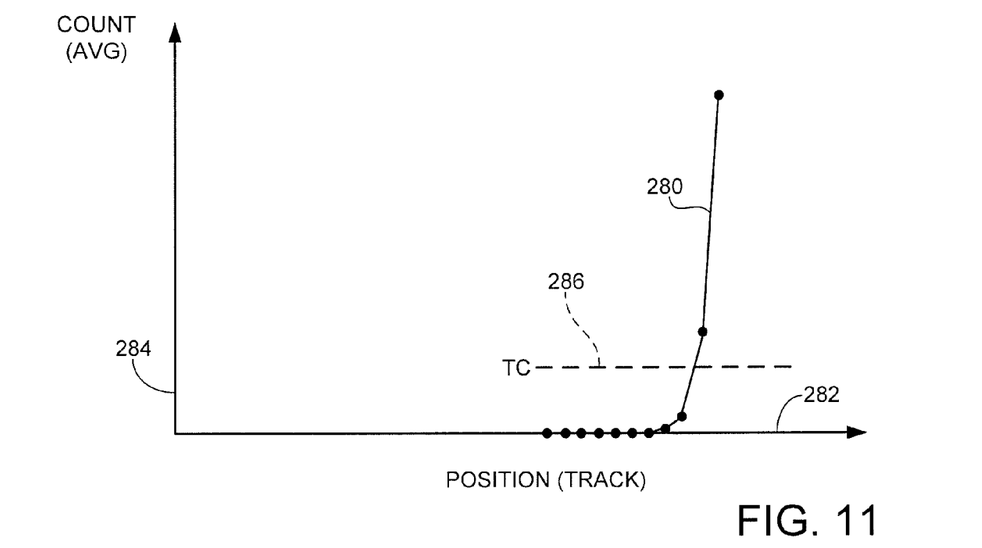
FIG. 11 provides an avalanche response in accumulated counts from the thermally responsive sensor(s) based on actual (qualified) contact events.

FIG. 11 depicts an exemplary accumulated count curve 280 applied against a position (tracks) x-axis 282 and accumulated count y-axis 284. The curve represents exemplary types of response for both read and write processing during the routine of FIG. 8. As can be seen, an avalanche type response can be observed resulting from actual contact events between the transducer 130 and the medium 132. Suitable TC thresholds can be selected accordingly, such as denoted at 286.

Figure 12:
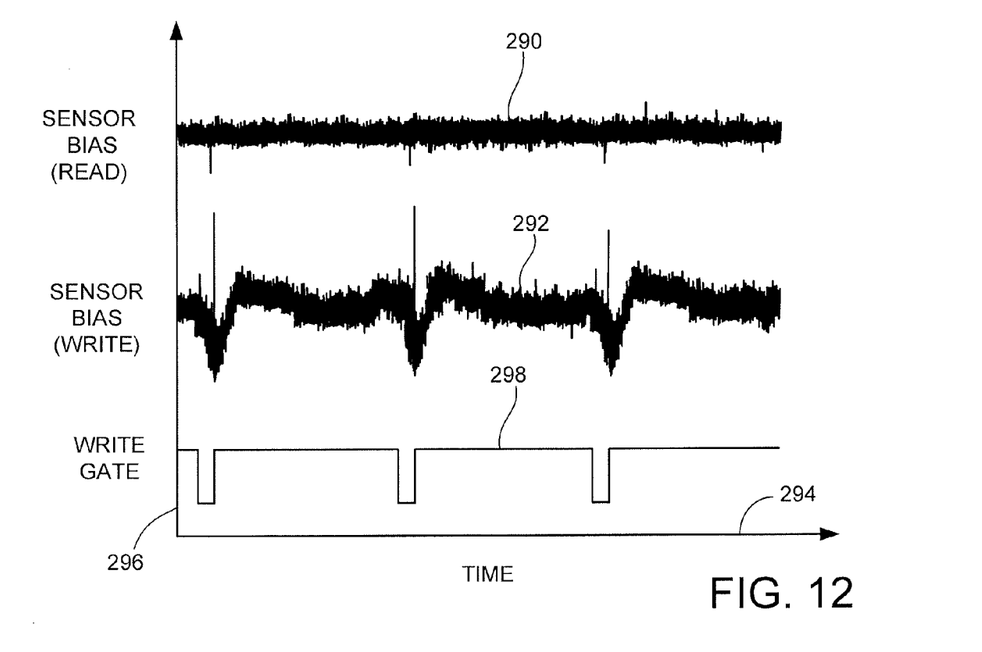
FIG. 12 graphically represents bias signals obtained from the thermally responsive sensor(s) during respective read and write operations.

FIG. 12 shows representative read and write bias (response) curves 290, 292 plotted against a time x-axis 294 and signal amplitude y-axis 296. The read response curve 290 represents the input response from a selected thermally responsive sensor 150 during read processing, and the write response curve 292 represents the corresponding input response from the sensor 150 during write processing. A write gate signal 298 denotes the periodic occurrence of the servo wedges 156 (FIG. 3) and the associated drops in write response from the sensor 150. This demonstrates the efficacy of counting and subtracting out the servo wedge count from the fault register 138 in the preamp 128 to obtain a more accurate assessment of peaks in the write response curve 292.

From the foregoing it will be understood that the various embodiments disclosed herein can provide a number of benefits. The in situ contact detection scheme advantageously detects actual vertical contact between the transducers and the media directly, rather than merely relying on horizontal (e.g., off-track) after-contact displacement. Consistent and repeatable measurements can be obtained across all media/transducer/radius combinations. The methodology is readily adaptable for field use in both setting suitable read and write heater power levels, and also in subsequently detecting actual contact events.

In some embodiments, the methodology reduces the myriad variables affecting fly height into the three basic parameters—gain/amplitude levels, bias levels and threshold detection levels—and these three parameters can be updated as required during subsequent field operation. Reduced slider/media contact can reduce burnishing, lubrication disturbance and other effects, thereby increasing system reliability. It has been found in some cases that the disclosed methodology can provide a significantly reduced overall calibration time to arrive at appropriate heater levels and an integrated contact detection mechanism that continuously verifies and, as necessary, adjusts these levels.

The in situ vertical displacement contact detection scheme (VIS Det) disclosed herein has been found to provide better and more accurate contact detection results than those that can be obtained from current generation off-track detection (OT Det) methodologies. In one example, both earlier contact and reduced variation results were obtained as compared to a current generation detection system, as set forth in Table 1.

TABLE 1

| | Read Processing | | | Write Processing | | |
|---|---|---|---|---|---|---|
| | OT Det | VIS Det | Delta | OT Det | VIS Det | Delta |
| Mean | 103.2 | 91.5 | −11.7 | 59.3 | 55.8 | −3.5 |
| Sigma | 15.8 | 15.4 | −0.4 | 11.8 | 10.4 | −1.4 |

The values in Table 1 are in terms of digital input of heater power when contact was detected. It can be seen that both the average power of an actual contact event (mean) and the variation (sigma) are more sensitive and repeatable with the system disclosed herein (VIS Det) as compared to current generation off-track (horizontal displacement) configurations (OT Det).

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
    positioning a transducer with respect to a recording medium, the transducer comprising a write element, a read element, a heater and a thermally responsive sensor;
    accumulating a count of servo wedges on the medium encountered by the transducer during data writing; and
    detecting a contact event between the transducer and the medium responsive to an accumulated plural count of pulses in a bias signal obtained from the thermally responsive sensor and the accumulated count of servo wedges.

2. The method of claim 1, further comprising applying power to the heater during the writing of data using the write element, wherein the power applied to the heater is at a power level selected responsive to the thermally responsive sensor.

3. The method of claim 1, wherein the contact event is detected during the writing of data to the medium.

4. The method of claim 1, further comprising performing a read operation to read data by applying a read bias signal to the read element, and detecting a second contact event during the application of the read bias signal.

5. The method of claim 1, wherein the heater is a first heater, the transducer further comprises a separate, second heater, and power is applied during the writing of data to a selected one of the first or second heaters selected responsive to the thermally responsive sensor.

6. The method of claim 5, wherein the power applied to the first heater is a first power level, wherein the power applied to the second heater is a different, second power level, and wherein the first and second power levels are respectively selected responsive to the thermally responsive sensor.

7. The method of claim 1, wherein the detected contact event is used to select a power level applied to the heater during the accumulating step.

8. The method of claim 1, wherein one or both of the heater and the thermally responsive sensor are combined with one or both of the write element or the read element.

9. The method of claim 1, wherein the detecting step comprises:
    accumulating a first total number of pulses in the bias signal;
    determining the accumulated plural count of pulses responsive to a difference between the first total number of pulses and the total number of accumulated servo wedges.

10. The method of claim 1, wherein the positioning step further comprises coupling a preamplifier/driver circuit to the transducer to supply write signals to the write element, to supply read bias signals to the read element, to supply heater signals to adjust the fly height of the transducer, and to supply a bias current through the thermally responsive sensor to generate the bias signal therefrom.

11. An apparatus comprising:
    a recording medium;
    a transducer adjacent the recording medium comprising a write element, a read element, a first heater operative during writing of data to the medium by the write element a second heater operative during reading of data from the medium using the read element, and a thermally responsive sensor; and
    a control circuit coupled to the transducer and adapted to apply respective first and second power levels to the respective first and second heaters to establish selected fly heights of the transducer relative to the medium, to detect a contact event between the transducer and the medium responsive to an accumulated plural count of pulses in a bias signal obtained from the thermally responsive sensor, and to select the respective first and second power levels responsive to the thermally responsive sensor.

12. The apparatus of claim 11, wherein the control circuit generates and stores in a memory a power level value responsive to the thermally responsive sensor, the control circuit further operative to apply the power level value to a driver circuit which in turn applies the power to the heater in an amount associated with a magnitude of the power level value.

13. The apparatus of claim 11, wherein the control circuit comprises a comparator adapted to compare the bias signal from the thermally responsive sensor to a selected threshold value to identify a first count of potential contact events between the transducer and the medium, the selected threshold value determined responsive to the thermally responsive sensor.

14. The apparatus of claim 13, wherein the control circuit further comprises a fault register which accumulates a total accumulated count of servo wedges on the medium, and an analysis circuit which subtracts the total accumulated count of servo wedges from the first count of potential contact events from the comparator to determine the accumulated plural count of pulses in the bias signal obtained from the thermally responsive sensor.

15. The apparatus of claim 11, wherein the control circuit is further adapted to:
    write data to the medium using the write element while monitoring the bias signal obtained from the thermally responsive sensor;
    accumulate a first total number of pulses in the bias signal during the monitoring;
    count a total number of servo wedges on the medium during the writing; and
    determine the accumulated plural count of pulses responsive to a difference between the first total number of pulses and the total number of counted servo wedges.

16. The apparatus of claim 11, wherein the thermally responsive sensor comprises more than one sensor, each sensor placed in a location to collect information regarding the contact event.

17. An apparatus comprising:
    a recording medium adapted for rotation about a central axis, the recording medium storing a plurality of spaced apart servo wedges that define concentric tracks adapted to store data in data sectors between adjacent pairs of the servo wedges;
    a transducer adjacent the recording medium comprising a write element adapted to store data to the data sectors, a read element adapted to read back the data stored to the data sectors and to read back servo data from the servo wedges, a write heater adapted to lower a fly height distance between the write element and the medium responsive to an applied write heater value, a read heater adapted to lower a fly height distance between the read element and the medium responsive to an applied read heater value, and at least one thermally responsive sensor; and
    a preamplifier/driver circuit adapted to, during a write operation, apply write signals to the write element to write data to a selected track, apply the write heater value to the write heater to establish a first fly height distance for the write element, apply a bias current to the thermally responsive sensor, and to detect a contact event during the write operation responsive to an accumulated plural count of pulses in a bias signal obtained from the applied bias current to the thermally responsive sensor, wherein the preamplifier/driver circuit comprises a comparator which compares the bias signal to a selected threshold value determined responsive to the thermally responsive sensor.

18. The apparatus of claim 17, wherein the preamplifier/driver circuit further generates and stores the write heater value and the read heater value in a memory responsive to at least one detected pulse from the thermally responsive sensor.

19. The apparatus of claim 17, wherein the preamplifier/driver circuit is further adapted to transfer write currents to the write element to write data to the medium, accumulate a count of servo wedges on the medium encountered by the transducer during the writing of data, and to detect the contact event responsive to the accumulated plural count of pulses in the bias signal and the accumulated count of servo wedges.

20. The apparatus of claim 17, wherein the write heater value is determined by the preamplifier/driver circuit responsive to the detected contact event and stored in a first memory location.

\* \* \* \* \*